United States Patent [19]

Braun

[11] 4,132,654

[45] Jan. 2, 1979

[54] X-RAY FOCAL SPOT TEST SYSTEM

[75] Inventor: Martin Braun, Stamford, Conn.

[73] Assignee: The Machlett Laboratories, Inc., Stamford, Conn.

[21] Appl. No.: 702,178

[22] Filed: Jul. 2, 1976

[51] Int. Cl.[2] .......... G03B 5/17

[52] U.S. Cl. .......... 250/320; 350/162 ZP

[58] Field of Search .......... 350/162 ZP; 250/320, 250/482

[56] References Cited

U.S. PATENT DOCUMENTS 3,263,079 7/1966 Mertz et al. .......... 250/320

OTHER PUBLICATIONS

Barrett et al., "Fresnel Zone Plate Imaging in Radiology and Nuclear Medicine," *Optical Engineering,* vol. 12, No. 1, Jan./Feb. 1973, pp. 9-10.

Goldfischer, "Comment on 'Theoretical Interpretation of Moire Patterns,'," *Journal of the Optical Society of America,* vol. 54, No. 6, Jun. 1964, p. 845.

Oster et al., "Theoretical Interpretation of Moire Patterns," *Journal of the Optical Society of America,* vol. 54, No. 2, Feb. 1964, pp. 169-171.

*Primary Examiner*—Alfred E. Smith

*Assistant Examiner*—T. N. Grigsby

*Attorney, Agent, or Firm*—John T. Meaney; Joseph D. Pannone; Harold A. Murphy

[57] ABSTRACT

An X-ray system comprising an X-ray tube provided with a target focal spot area from which an X-ray beam emanates from the tube, an X-ray Fresnel zone plate disposed interceptingly in the path of the X-ray beam, and an image receptor disposed to receive the resulting image of the zone plate conveyed by the X-ray beam.

10 Claims, 13 Drawing Figures

X-RAY FOCAL SPOT TEST SYSTEM

BACKGROUND OF THE INVENTION

1. Field of the Invention

This invention relates generally to radiographic systems and is concerned more particularly with an X-ray test system for evaluating focal spots in X-ray tubes.

2. Discussion of Prior Art

An X-ray tube usually comprises an evacuated envelope wherein an electron emitting cathode is disposed for electrostatically beaming electrons onto an aligned focal spot area of an anode target surface. Generally, the focal spot area of the target surface is sloped in the direction of a radially aligned, X-ray transparent window in the tube envelope. Accordingly, X-rays generated in the target material by the impinging electrons radiate from the focal spot area and pass in a beam through the X-ray transparent window of the tube. As a result, the X-ray beam appears to be emanating from a radial projection of the focal spot area on the sloped target surface. Thus, the resolving power of the X-ray beam may be maximized by maintaining the projected focal spot area as small as possible such that is approximates a point source of X-radiation.

In operation, the X-ray beam may be directed through a selected portion of a patient and be modified by the X-ray absorption properties of the internal structure therein. As a result, the modified X-ray beam may convey an X-ray image of the internal structure to an aligned receptor, such as an X-ray film, for example, which produces a visible shadow image of the X-ray image conveyed by the beam. However, it has been found that internal structure comparable in size to the projected focal spot appears blurred in the output visible image, and may even appear as doublets when higher magnification techniques are employed. Thus, for fine detail structure, the projected focal spot may not function as a point source, and the resulting X-ray beam may have insufficient resolving power for sharply defining the image of the structure. Consequently, the size of the projected focal spot may contribute to geometrical unsharpness which constitutes a limiting factor in many radiological techniques, such as magnification of small blood vessels in angiography, for example.

As a result, it has become common practice when describing a radiological procedure to specify the geometry and the nominal size of the focal spot, which is equivalent to defining a tolerable geometric unsharpness in producing the visible image. Accordingly, the National Electrical Manufacturers Association (NEMA) has advocated the standardization of focal spot measurements by the use of two methods, namely, the pin-hole camera method and the star test plate method. The pin-hole camera method has not been found satisfactory for wide spread use because of the limited amount of X-radiation passed through the pinhole and the associated requirement for high electron current in the X-ray tube being tested. The star test plate method has proved to be more practical for routine use and also may provide some information on energy distribution in the focal spot. However, due to the complex resolution pattern produced by the star test plate, measurements for determining focal spot size are not readily obtained with the ease and accuracy desired.

Therefore, it is advantageous and desirable to provide an X-ray tube test system having means for readily evaluating focal spots in X-ray tubes.

SUMMARY OF THE INVENTION

Accordingly, this invention provides a test system and a method for readily evaluating focal spots in X-ray tubes. The system comprises an X-ray tube having an evacuated envelope wherein an electron-emitting cathode is disposed for electrostatically beaming electrons onto an aligned focal spot area of an anode target surface to generate a divergent X-ray beam which emanates therefrom. A Fresnel zone plate is suitably disposed at a predetermined distance from the focal spot for permitting the divergent beam egressing from the tube to pass through the thickness of the zone plate. A suitable image receptor, such as an X-ray film, for example, is positioned at a predetermined distance from the zone plate for receiving the X-ray beam passed therethrough and producing a magnified visible image of the plate.

The Fresnel zone plate is provided with a concentric array of contiguous equiarea rings having respective radii proportional to the square roots of consecutive integers. Alternate rings of the array are opaque to X-rays; and the interposed rings are transparent to X-rays. Thus, adjacent X-ray opaque and X-ray transparent rings constitute respective line pairs which have increasingly greater spatial frequencies with increasing radial distance from the center of the array. Consequently, the magnified image of the Fresnel zone plate produced by the image receptor exhibits a concentric array of alternate dark and light rings. However, at certain critical spatial frequencies in the image, shadow portions of adjacent opaque rings merge to produce losses of resolution and phase reversal where circumferential portions of the dark and light rings are converted to light and dark areas, respectively. As a result, the magnified image of the zone plate includes a parallel array of spaced chordal blur lines where losses of resolution occur. Adjacent the areas of resolution losses, the dark and light rings intersected by the chordal blur lines have circumferential portions thereof converted to light and dark portions, respectively, due to phase reversal. A close examination of the manner in which phase reversal takes place, as by abrupt discontinuities, spikes, or lateral displacements of the rings, for examples, provides a means for ascertaining the energy distribution in the focal spot.

This invention also provides a method for evaluating the focal spot including the steps of disposing a Fresnel zone plate between the focal spot and an image receptor to produce a magnified image of the plate having therein a parallel array of spaced chordal blur lines, measuring the distance between two diametrically spaced blur lines in the image to obtain an image diametric value for the resolution losses, measuring the distance between any two points in the image and comparing it to the actual distance between the two corresponding points in the zone plate to obtain a value for the magnification, and using the diametric and the magnification values to obtain an evaluation of the focal spot.

BRIEF DESCRIPTION OF THE DRAWINGS

For a better understanding of this invention, reference is made in the following detailed description to the accompanying drawing wherein:

FIG. 7*b* is an elevational view of a star pattern image which may be obtained from a double line source focal spot shown in FIG. 7*a.

DESCRIPTION OF THE PREFERRED EMBODIMENT

Figure 1:
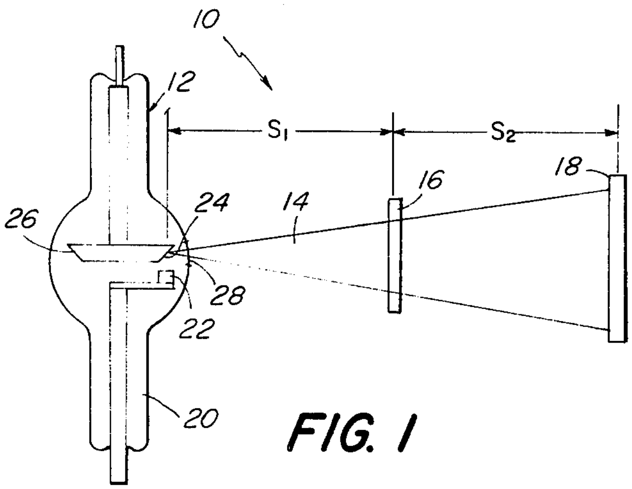
FIG. 1 is a schematic view of an X-ray tube test system embodying the invention.

Referring to the drawing wherein like characters of reference designate like parts, there is shown in FIG. 1 an X-ray tube test system 10 comprising an X-ray tube 12 disposed for directing a divergent X-ray beam 14 through a suitably spaced test plate 16 and onto a further spaced image receptor 18, such as an X-ray film, for example. The X-ray tube 12 may be of the rotatable anode type having an evacuated envelope 20 wherein an electron-emitting cathode 22 is disposed for beaming electrons onto an aligned focal spot area of a sloped anode target surface 26. Thus, there is generated the divergent X-ray beam 14 which emanates from the focal spot area 24 and egresses from the tube through an X-ray transparent window 28 in the envelope 20. Since the window 28 is radially aligned with the focal spot area 24 on sloped target surface 26, the divergent X-ray beam 14 appears to be emanating from a radial projection of the focal spot area.

The test plate 16 is positioned a predetermined distance $S_1$ from the focal spot area 24 and is disposed such that X-rays in the beam 14 pass through the thickness of test plate 16. Also, the image receptor 18 is positioned a predetermined distance $S_2$ from the test plate 16 and is disposed to produce a resultant magnified image of the test plate. The magnification (M) thus obtained is:

$$M = (S_1 + S_2)/S_1 \qquad (1)$$

whereby $$S_2/S_1 = M - 1 \qquad (2)$$

Thus, increasing $S_2$ at the expense of $S_1$ provides a greater magnification (M).

Figure 2:
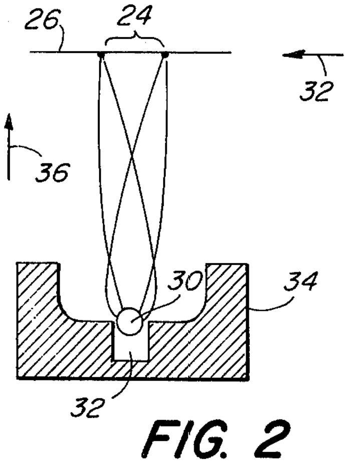
FIG. 2 is a schematic view of a focal spot obtainable with the X-ray tube shown in FIG. 1.

As shown in FIG. 2, the cathode 16 may comprise a helically wound filament 30 extending radially with the aligned slope portion of target surface 26, and disposed longitudinally within the opening of a slotted cavity 32 in a focusing cup 34. Thus, electrons emitted from the longitudinal portion of filament 30 adjacent the sloped target surface 26 are focused directly onto the focal spot area 24. On the other hand, electrons emitted from the longitudinal portion of filament 30 adjacent the cavity 32 are cross-focused onto the focal spot area 24. Consequently, X-ray tube manufacturers generally attempt to locate the target surface 26 where the cross-focused electrons intersect the paths of the directly focused electrons in order to avoid producing a focal spot having four peaks of intensity. Thus, the focal spot generally comprises a double point source when viewed along the cathode-anode axis, as indicated by the arrow 36, and a line source when viewed perpendicular to the cathode-anode axis, as indicated by the arrow 38. At large magnification, the double point source may produce double shadow images whereby fine details, such as blood vessels, for example appear as doublets.

Figures 3A, 3B, 3C:
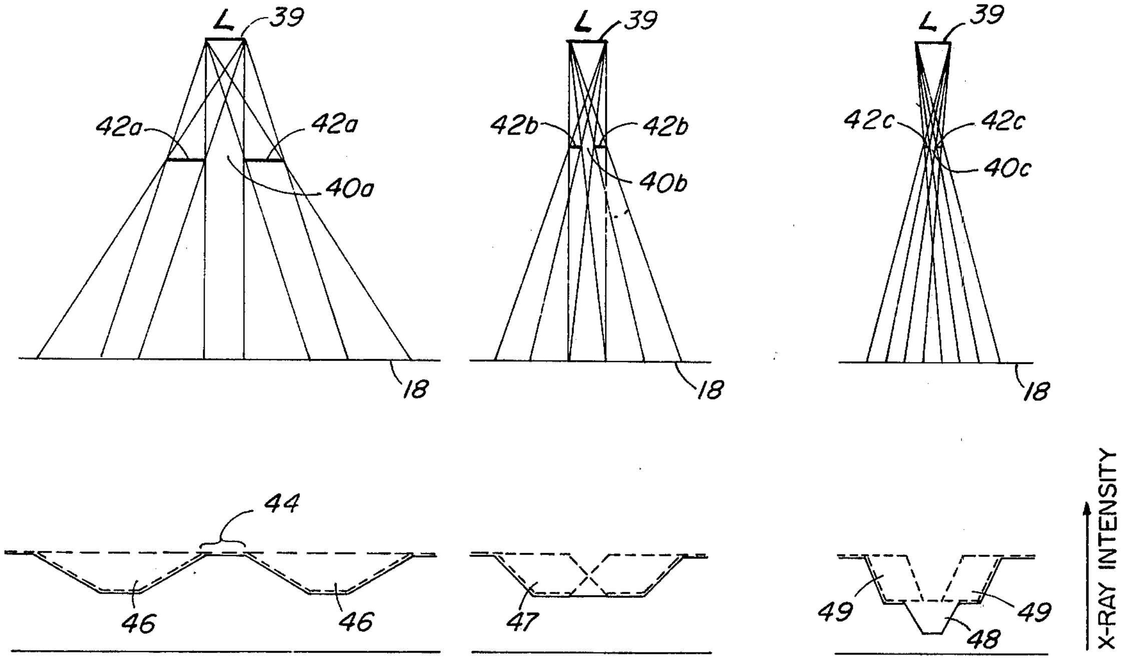
FIGS. 3*a*–3*c* are diagrammatic views of X-rays emanating from a typical focal spot and producing shadow image of spaced X-ray absorbers.

For a more complete understanding of this invention, there is shown in FIG. 3*a* a line source focal spot 39 having a linear dimension L. Focal spot 39 is disposed to direct a divergent X-ray beam through a gap 40 which is defined by two adjacent absorber strips 42, respectively. The gap 40 and each of the absorber strips 42 have respective linear dimensions equal to "w." Thus, gap 40 and one of the adjacent strips 42 constitute a line pair having a spatial frequency equal to ½ w. In FIG. 3*a,* a line pair comprising a gap 40*a* and an absorber strip 42*a* has a width dimension (2w) which is large compared to the focal spot dimension L. Consequently, the associated intensity distribution shows a lucent area 44 corresponding to gap 40*a* and separating two shadow areas 46 corresponding to the absorber strips 42*a,* respectively. FIG. 3*b* shows a line pair comprising a gap 40*b* and an adjacent absorber strip 42*b* having a spatial frequency (½ w) such that the shadows of the two adjacent strips 42*b* just merge to blur out the image of the gap 40*b* and produce a uniform shadow area 47. Thus, $$2wM = f(S_1/S_2) = f(M-1) \qquad (3)$$

and $$L = 2wM/M-1 \qquad (4)$$

FIG. 3*c* shows a line pair comprising a gap 40*c* and an adjacent absorber strip 42*c* having a width dimension (2w) which is smaller than the focal spot dimension L. As a result, phase reversal occurs and the gap 40*c* is imaged as a darker area 48 between two adjacent shadows 49 of the absorber strips 42*c,* respectively.

Figure 4:
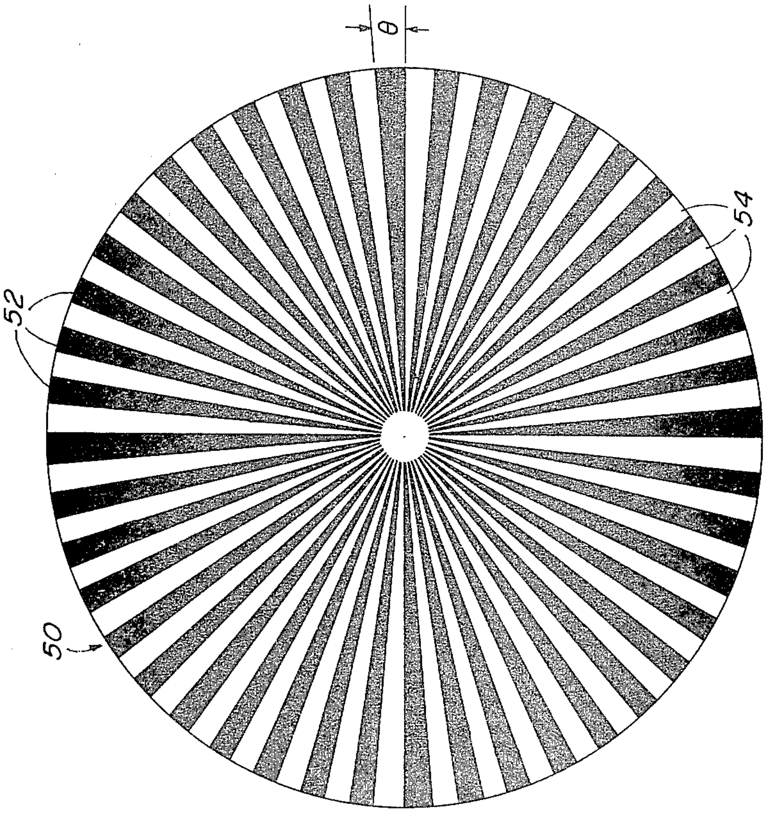
FIG. 4 PRIOR ART
FIG. 4 is an elevational view of a conventional star pattern test plate.

In FIG. 4, there is shown a conventional star pattern test plate 50 which may be disposed in place of the test plate 16 shown in FIG. 1. The star pattern test plate 50 comprises a circular array of contiguous equiangular sectors or wedges 52 which converge toward the center of the array. Alternate wedges 52 of the array are X-ray opaque and the interposed wedges 54 are X-ray transparent. A typical star pattern test plate, for example, may have 2° wedges, 90 of which are X-ray opaque and the other 90 are X-ray transparent. Thus, each of the X-ray opaque wedges 52 and an adjacent transparent wedge 54 constitute a respective line pair which varies in spatial frequency with radial distance from the center of the array. Accordingly, the spatial frequencies of the line pairs in a star pattern test plate are a minimum adjacent the periphery of the plate and are infinite at the center of the array. Since each of the wedges has an angle $\theta$ at any radius r, the associated line pair at radius r has a width dimension:

$$2w = 2\theta r \qquad (5)$$

Consequently, the spatial frequency ($F_s$) of a star pattern is:

$$f_s = 1/2\theta r \quad (6)$$

Figure 5:
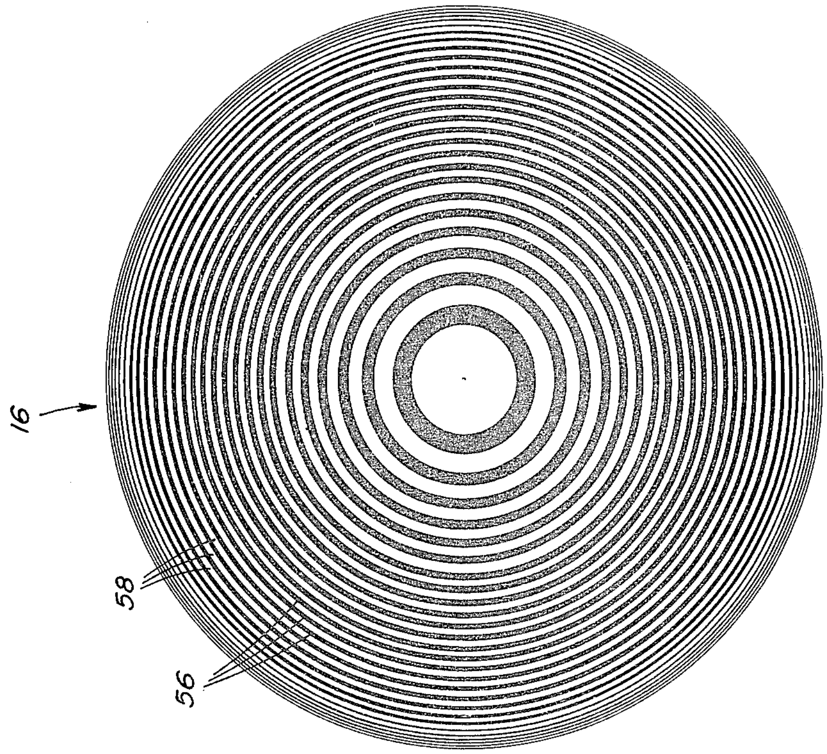
FIG. 5 is an elevational view of the Fresnel zone test plate of this invention.

In FIG. 5, there is shown a Fresnel zone test plate 16 in accordance with this invention. The zone plate 16 comprises a concentric array of contiguous equiarea rings having respective radii equal to the square roots of consecutive integers. Alternate rings 56 of the array are X-ray opaque and the interposed rings 58 of the array are X-ray transparent. Thus, each of the X-ray opaque rings 56 with an adjacent transparent ring 58 constitutes a respective line pair having a constant spatial frequency with respect to the associated radial distance from the center of the array. However, the spatial frequencies of the line pairs in the zone plate increase with increasing radial distance from the center of the array. Accordingly, the spatial frequency of the line pairs is a minimum adjacent the center of the array and is a maximum adjacent the periphery of the zone plate. The edge of the nth zone is located at a radius $$r_n = r_1\sqrt{n} = r_N\sqrt{n/N} \quad (7)$$

where $r_1$ is the radius of the outer periphery of the first transparent ring (not including the center circular area), $r_N$ is radius of the zone plate and N is the total number of rings. Thus, the width (2w) of a line pair on the Fresnel zone test plate 16 is:

$$2w = r_n - r_{n-1} \approx (r_1^2/2r_n) \quad (8)$$

Therefore, the spatial frequency of the Fresnel zone plate at a radius $r_n$ is:

$$f_z = 2r_n/r_1^2 \quad (9)$$

FIG. *6a* shows a double point source focal spot 60 which may be produced by the X-ray tube 12 shown in FIG. 1. The focal spot 60 comprises two point sources separated by a distance $L_p$. Accordingly, with the star pattern test plate 50 disposed in place of the test plate 16 in FIG. 1, the resulting magnified image 62 produced by image receptor 18 may be as shown in FIG. *6b*. In the magnified image 62, the resolution losses occur as two symmetrical groups of substantially circular blur lobes, 64 and 66, respectively, which extend radially outward in diametrically opposed directions from the center of the star image. The respective lobes 64 and 66 in the diametrically opposed groups have successively smaller diameters and pass through the center of the star image. Consequently, corresponding lobes 64 and 66 in the respective groups extend maximum radial distances which, in combination, define an associated diameter in the star image where the spatial frequency of the line pairs is such that resolution loss occurs.

Thus, since the line pairs in the star pattern have a minimum spatial frequency adjacent the outer periphery thereof, the combined maximum radial distances of the two outermost lobes 64 and 66, respectively, define an associated diameter Ds in the image where the first loss of resolution occurs. The diameter Ds in the star image is related to the corresponding diameter ds in the star test plate 50 by the relationship: *Ds = Mds*. Accordingly, from equation (4):

$$L_p = 2\theta rs\,(M/M-1) = \theta ds\,(M/M-1) = \theta(Ds/M-1) \quad (10)$$

The magnification M may be determined by measuring the distance between any two points in the magnified image 62 and dividing it by the actual distance on the star pattern test plate 50, such as the overall diameters of each, for example. Accordingly, since Ds may be measured directly from the magnified image 62, the size of an "effective" focal spot having a uniform energy distribution and providing a corresponding resolution may be determined from equation (10).

With X-ray tube 12 producing the same focal spot 60 and the Fresnel zone plate 16 disposed as shown in FIG. 1, the resulting magnified image 66 produced by image receptor 62 is shown in FIG. *6c*. In the magnified image 66, the equivalent resolution losses occur as diametrically symmetric groups of substantially parallel blur lines, 67 and 68, respectively, which extend chordally across the image 66 and are radially spaced apart on diametrically opposing sides of the center of the zonal array image. Thus, each of the blur lines 67 has a corresponding blur line 68 which is substantially equidistant from the center of the zonal array image. Consequently, a diametrical line terminating at corresponding lines 67 and 68 in the respective groups defines a diameter in the zonal array image where the spatial line frequency is such that resolution loss occurs.

Thus, since the line pairs in the zonal array have a minimum spatial frequency adjacent the center thereof, the diametric distance between the two corresponding lines 67 and 68 closest to the center define an associated diameter Dz in the image where the first loss of resolution occurs. The diameter Dz in the image 66 is related to the corresponding diameter dz on the Fresnel zone plate 50 by the relationship: *Dz = Mdz*. Accordingly, from equation (4), we have $$L_p = \frac{r_1^2}{2r_n}\,\frac{M}{M-1} = \frac{r_1^2}{dz}\,\frac{M}{M-1} = \frac{r_1^2}{Dz}\,\frac{M^2}{M-1} \quad (11)$$

As before, the magnification M may be obtained by measuring the distance between any two points in the image 66 and dividing t by the actual distance between the same two points on the zone plate 16, such as the overall diameters of each, for example. Thus, since $r_1$ is known or may be readily measured on the zone plate 16 and the diameter Dz may be measured in the image 66, the size of an "effective" focal spot having a uniform energy distribution and providing a corresponding resolution may be determined from equation (11).

Figure 6B:
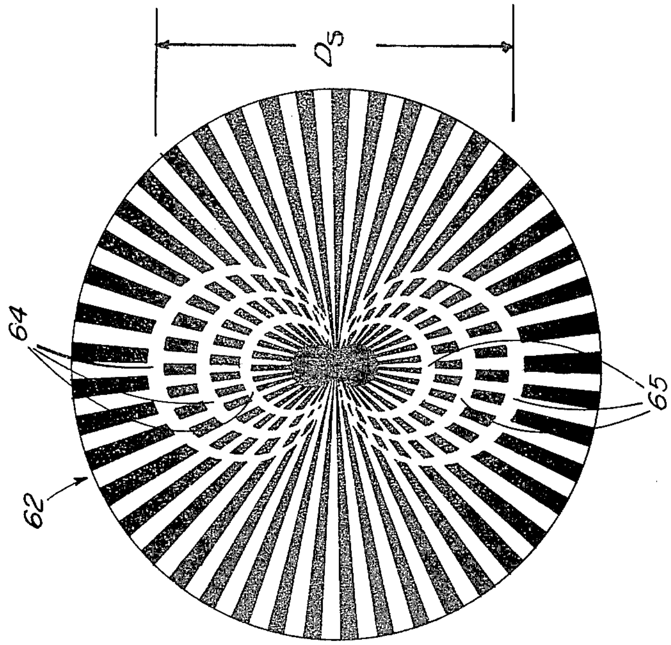
FIG. 6b PRIOR ART
FIG. 6*b* is an elevational view of star pattern image which may be obtained from the double point source focal spot shown in FIG. 6*a;*
Figure 6A:
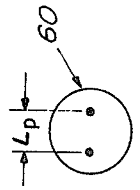
FIG. 6*a* is a schematic view of a double point source focal spot.
Figure 6C:
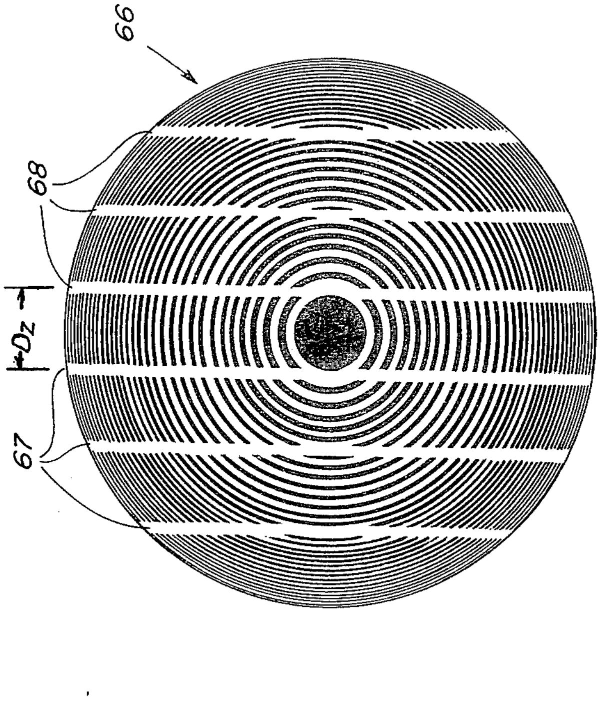
FIG. 6*c* is an elevational view of a zone plate pattern image which may be obtained from the double point source focal spot shown in FIG. 6*a;*

A comparison of FIGS. *6a*–*6c* reveals that the distance between the two closest lines 67 and 68, respectively, in FIG. *6c* is measured in the same direction as the linear distance $L_p$ is measured between the two points sources of focal spot 60. However, the maximum radial distances of the two outermost lobes 64 and 66, respectively, in FIG. *6b* is measured in a direction orthogonal to the measurement of the linear distance $L_p$. Also, since the images of the wedges 52 in FIG. *6b* converge toward the center of the star image, the spatial frequency of the line pairs approaches infinity, and the center of the star image 62 is produced as a large blurred area. Also, all of the circular blur lobes 64 and 65, respectively, pass through the center of the image 62. On the other hand, the center of the zone plate image in FIG. *6b* is relatively clear since the blur lines 67 and 68, respectively, are radially spaced from the center of the zonal plate image. Furthermore, measurements between the parallel blur lines 67 and 68, respectively, in FIG. 6c may be accomplished much more readily and with greater accuracy than measurements between the maximum radial distances of corresponding lobes 64 and 66 in FIG. 6b.

Figure 7B:
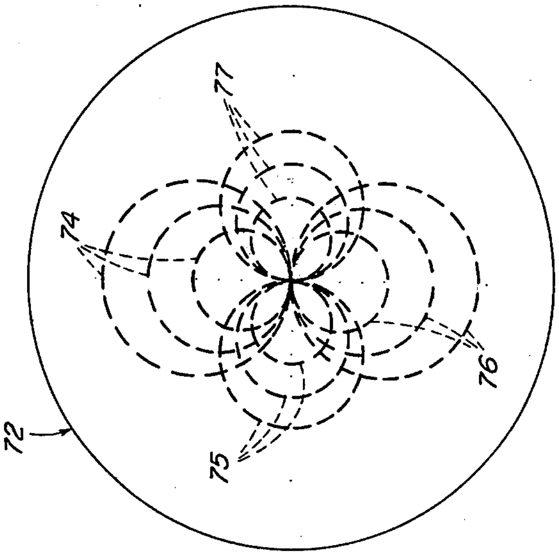
FIG. 7b PRIOR ART
Figure 7A:
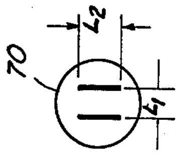
FIG. 7*a* is a schematic view of a double line source focal spot.

In FIG. 7a, there is shown a double line source focal spot 70 which may be produced by the X-ray tube 12 shown in FIG. 1. The focal spot 70 comprises a pair of line sources having respective longitudinal dimensions equal to $L_2$ and separated by a distance equal to $L_1$ which may or may not be equal to $L_2$. With the star pattern test plate 50 disposed in place of the test plate 16 in FIG. 1, the resulting magnified image 72 produced by the image receptor 18 may be as shown in FIG. 7b, the images of wedges 52 and 54 being omitted for purposes of simplicity. In the magnified image 72, the resolution losses occur as four orthogonally disposed groups of substantially circular blur lobes 74–77, respectively, which extend radially outward from the center of the star image 72. The diametrically opposing groups of lobes 74 and 76, respectively, are symmetrical and are similar to the lobes 64 and 66, respectively, in FIG. 6b. Thus, by measuring the combined maximum radial distances of the outermost lobes 74 and 76 and determining the respective magnification (M), the orthogonally extending dimension $L_1$ may be determined for an "effective" focal spot, as described in connection with FIG. 6b. Similarly, the diametrically opposing groups of lobes 75 and 77, respectively, are associated with the orthogonally extending dimension $L_2$ of focal spot 70. Accordingly, by measuring the maximum radial distance of the outermost lobes 75 and 77, and determining the respective magnification M, as described, the dimension $L_2$ may be calculated for an "effective" focal spot with the use of equation (10).

Figure 7C:
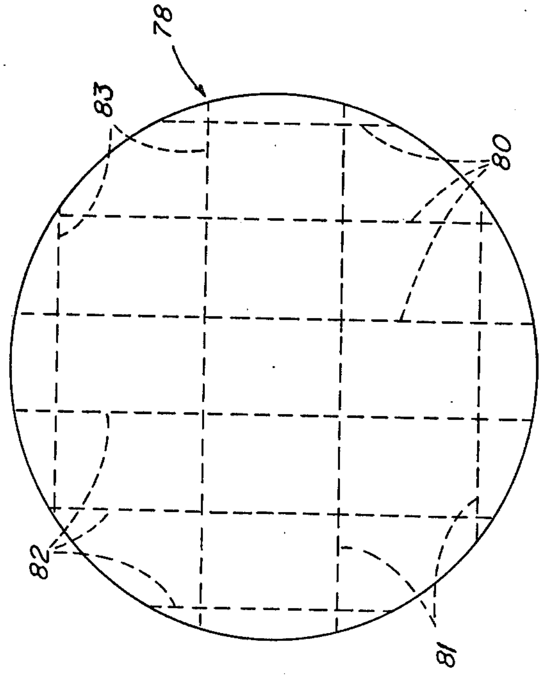
* and FIG. 7*c* is an elevational view of a zone plate pattern image which may be obtained from the double line source focal spot shown in FIG. 7*a.*

With X-ray tube 12 producing the same focal spot 70 and the Fresnel zone plate 16 disposed as shown in FIG. 1, the resulting magnified image 78 is shown in FIG. 7c, the rings 56 and 58 being omitted for purposes of simplicity. in the magnified image 78, the equivalent resolution losses occur as a grid comprising two diametrically spaced groups of chordal parallel lines, 81 and 83, respectively, which are intersected by two other diametrically spaced groups of substantially parallel lines, 82 and 84, respectively. The diametrically spaced groups of chordal parallel lines, 80 and 82, respectively, are symmetrical and are similar to the groups of parallel lines, 67 and 68, respectively, shown in FIG. 6c. Thus, by measuring the distances between the two corresponding lines 80 and 82 closest to the center of the zonal array image 78 and determining the respective magnification (M), the codirectional dimension $L_1$ may be calculated for an "effective" focal spot, as described in connection with FIG. 6c. Similarly, the diametrically spaced groups of chordal parallel lines 82 and 84, respectively, are associated with the codirectional dimension $L_2$ of focal spot 70. Accordingly, by measuring the distance between the two corresponding lines 81 and 83 closest to the center of the zonal array image 78 and determining the respective magnification (M) as described, the dimension $L_2$ may be calculated for an "effective" focal spot with the use of equation (11).

The relation between locations of resolution loss in the image and the Modulation Transfer Function (MTF) "blur" frequency ($f_o$) of the focal spot can be derived from the equation:

$$f_I = \frac{S_1 + S_2}{S_2} f_o = \frac{M}{M-1} f_o \tag{12}$$

where $F_I$ is the spatial frequency of the image pattern at the point of resolution loss. Thus, for the location of resolution loss at radius ($R_s$) in the star pattern image, we have:

$$R_s = r_s M \tag{13}$$

By solving equation (6) for $r_s$ and substituting in equation (13), we have:

$$R_s = \frac{1}{2\theta f s} M \tag{14}$$

However, in this instance, fs is equal to $f_I$ in equation (12). Therefore, by solving equation (12) for M and substituting in equation (14), we have:

$$R_s = \frac{1}{2\theta} \frac{M-1}{f_o} \tag{15}$$

Thus, for a star pattern image, the relation between the location ($R_s$) of resolution loss and the "blur" frequency ($f_o$) of the focal spot are inversely proportional to one another.

For a Fresnel zone plate image, the location of resolution loss at radius ($R_z$) in the image is:

$$R_z = r_z M \tag{16}$$

By solving equation (9) for $r_z$ and substituting in equation (16) we have:

$$R_z = \frac{r_1^2}{2} f_z M \tag{17}$$

In this instance, $f_z$ is equal to $f_I$ in equation (12). Therefore, by solving equation (12) for M and substituting in equation (17), we have:

$$R_z = \frac{r_1^2}{2} \frac{M^2}{M-1} f_o \tag{18}$$

Thus, for a Fresnel zone plate image, the relation between the location ($R_z$) of resolution loss and the "blur" frequency ($f_o$) of the focal spot are directly proportional to one another. Accordingly, the Fresnel zone test plate 50 as used in system 10 provides a faithful representation of the Modulation Transfer Function (MTF) of the imaging system.

For some focal spot energy distributions, the phase reversals, where black line images change to white and vice versa, may not occur as abruptly as shown in FIGS. 6b–6c and FIGS. 7b–7c. With a focal spot similar to the double point source focal spot 60 shown in FIG. 6a except X-rays also emanate from the area between the two point sources, for example, the phase reversals may occur as black and white spikes blending into white and black lines, respectively. Also, with a double point source similar to the double point source focal spot 60 shown in FIG. 6a except one of the point sources is stronger or more intense than the other, for example, the phase reversals may occur as a gradual lateral blending of the black and white lines. Thus, images of the star pattern test plate 50 and the Fresnel zone test plate 16 may provide information as the energy distribution in the focal spot. However, as compared to the resulting star pattern images, measurements of phase reversal locations are much easier to obtain from the corresponding Fresnel zone plate images where the phase reversals occur as straight parallel lines spaced radially from the center of the zonal array image. Furthermore, a Fresnel zone plate image produced by a photographic film receptor 18 may be used as a shadowgram in a holographic system for reconstructing an image of the focal spot. Thus, monochromatic light, such as a laser beam, for example, may be passed through the Fresnel zone plate image to produce on another film a picture of the energy distribution in the focal spot. The resulting image, thus obtained, is a faithful representation of the Modulation Transfer Function (MTF).

Thus, there has been disclosed herein an X-ray tube test system having Fresnel zone plate means for providing a faithful representation of the Modulation Transfer Function of the system as parallel chordal lines which are radially spaced from the center of the zonal array image. Thus, the Fresnel zone plate image provides means for evaluating the size, resolution, and energy distribution of the focal spot. Also, the Fresnel zone plate image provides means for reconstructing an image of the focal spot to obtain a picture of the energy distribution therein.

From the foregoing, it will be apparent that all of the objectives of this invention have been achieved by the structures shown and described herein. It also will be apparent, however, that various changes may be made by those skilled in the art without departing from the spirit of the invention as expressed in the appended claims. It is to be understood, therefore, that all matter shown and described herein is to be interpreted as illustrative rather than in a limiting sense.

What is claimed is:

1. A radiographic system for evaluating focal spots in x-ray tubes and comprising the combination of:

an x-ray tube including an anode target having a focal spot area of finite dimensions disposed for producing a divergent X-ray beam and directing the beam out of the tube;

arcuate line pair means having the structural characteristics of a Fresnel zone plate and spaced from the tube, the line pair means being disposed in the path of the X-ray beam for producing a single resolution modulated image of the focal spot; and image receptor means spaced from the line pair means and aligned therewith for receiving the modulated X-ray beam and producing a magnified visible shadow image thereof; means for determining dimensions of the focal spot area from dimensions of the visible shadow image.

2. A radiographic system as set forth in claim 1 wherein the line pair means includes means for representing the modulation transfer function of the system.

3. A radiographic system as set forth in claim 1 wherein the line pair means includes means for producing in the visible shadow image resolution losses directly proportional to the blur frequency of the focal spot.

4. A radiographic system as set forth in claim 1 wherein the line pair means includes means for producing in the visible shadow image resolution losses as a series of spaced parallel blur lines.

5. A radiographic system as set forth in claim 1 wherein the line pair means includes a concentric array of contiguous rings, alternate rings being X-ray opaque and the interposed rings being X-ray transparent.

6. A radiographic system as set forth in claim 4 wherein the X-ray opaque rings are spaced increasingly closer together with increasing radial distance from the center of the array.

7. A radiographic system as set forth in claim 5 wherein the line pair means comprises a Fresnel zone plate.

8. A method for evaluating a focal spot area in an X-ray tube and comprising the steps of:

operating the X-ray tube to produce a divergent X-ray beam, disposing an X-ray image receptor in the path of the beam, disposing a Fresnel zone plate between the X-ray tube and the image receptor to produce a visible shadow image having a parallel series of spaced linear resolution losses and associated phase reversals; and studying the phase reversals to evaluate the energy distribution in the focal spot comprising determining dimensions of the focal spot area from dimensions of the visible shadow image.

9. A method as set forth in claim 8 and including the additional steps of measuring the distance between two points in the image and comparing it to the distance between the two corresponding points on the zone plate to obtain the magnification (M).

10. A method as set forth in claim 9 and including the additional step of measuring the distances between two of the resolution losses.

* * * * *